(12) United States Patent
McLaughlin

(10) Patent No.: US 11,215,013 B2
(45) Date of Patent: Jan. 4, 2022

(54) MANUAL PIPE VALVE CONNECTOR FOR JOINTED PIPE CONNECTIONS WITH QUICK RELEASE CHECK VALVE ASSEMBLY AND USES THEREOF

(71) Applicant: Stuart McLaughlin, Magnolia, TX (US)

(72) Inventor: Stuart McLaughlin, Magnolia, TX (US)

( * ) Notice: Subject to any disclaimer, the term of this patent is extended or adjusted under 35 U.S.C. 154(b) by 547 days.

(21) Appl. No.: 16/107,767

(22) Filed: Aug. 21, 2018

(65) Prior Publication Data
US 2019/0003265 A1 Jan. 3, 2019

Related U.S. Application Data

(63) Continuation-in-part of application No. 15/330,946, filed on Feb. 3, 2015, now abandoned.

(51) Int. Cl.
| | |
|---|---|
| *F16L 19/00* | (2006.01) |
| *E21B 17/043* | (2006.01) |
| *F16L 15/08* | (2006.01) |
| *E21B 17/04* | (2006.01) |
| *E21B 17/046* | (2006.01) |

(52) U.S. Cl.
CPC ............ *E21B 17/043* (2013.01); *E21B 17/04* (2013.01); *E21B 17/046* (2013.01); *F16L 15/08* (2013.01); *F16L 19/005* (2013.01); *E21B 2200/05* (2020.05)

(58) Field of Classification Search
CPC ......... F16L 15/08; F16L 21/08; F16L 19/005; E21B 17/043; E21B 17/046

USPC .................................. 285/82, 404, 330, 913
See application file for complete search history.

(56) References Cited

U.S. PATENT DOCUMENTS

| | | | |
|---|---|---|---|
| 2007/0063513 A1* | 3/2007 | Boyd ...................... | F16L 15/04 285/355 |
| 2011/0180273 A1* | 7/2011 | Hughes ................... | E21B 17/04 166/380 |
| 2013/0146305 A1* | 6/2013 | Dupal .................... | E21B 17/043 166/380 |
| 2014/0050522 A1* | 2/2014 | Slaughter, Jr. ........ | E21B 17/043 403/342 |
| 2017/0198843 A1* | 7/2017 | McLaughlin ........... | F16L 19/02 |
| 2018/0058167 A1* | 3/2018 | Finol .................... | E21B 33/0415 |
| 2018/0171724 A1* | 6/2018 | Daigle ................... | E21B 17/02 |
| 2019/0063649 A1* | 2/2019 | Snyder, II ........... | F16L 27/0828 |

* cited by examiner

*Primary Examiner* — Aaron M Dunwoody
(74) *Attorney, Agent, or Firm* — Kearney, McWilliams & Davis, PLLC; William Yarbrough

(57) ABSTRACT

The present invention provides a novel clutch connector assembly for jointed pipe, threaded pipe, coiled tubing or any threaded or non-threaded pipe for a bottom hole assembly that eliminates the need to use screw threads to mate two pipes or mechanical assemblies, harbors a spring-loaded mechanical locking system in addition in to a pressure-activated, component protectant system, requires no significant tools, other than an Allen wrench or similar screw setting device, permits distributed torque loading, allows for movement in either a clockwise or counter clockwise rotational direction through interlocking castellations and presents a removeable and replaceable valve assembly preventing retrograde hydrocarbon advancement through a drilling pipe.

18 Claims, 13 Drawing Sheets

MANUAL PIPE VALVE CONNECTOR FOR JOINTED PIPE CONNECTIONS WITH QUICK RELEASE CHECK VALVE ASSEMBLY AND USES THEREOF

CROSS REFERENCE TO RELATED APPLICATIONS

The present application is a Continuation-in-Part application (CIP) of previously filed U.S. patent application Ser. No. 15/330,946 filed Feb. 3, 2015 the entire contents of which are incorporated by reference in their entirety.

CROSS-REFERENCE TO RELATED APPLICATIONS

Priority claimed to Non-Provisional U.S. Ser. No. 15/330, 946 filed Feb. 3, 2015

FEDERALLY SPONSORED RESEARCH OR DEVELOPMENT

Not Applicable

INCORPORATION BY REFERENCE OF MATERIAL SUBMITTED ON A COMPACT DISK

Not Applicable

FIELD OF THE INVENTION

The present invention relates generally to the design of a mechanical connection assembly used in conjunction with jointed pipe, threaded pipe, coiled tubing, stick pipe and any other threaded or non-threaded pipe section (or tubular) for downhole operations which involve and utilize inline safety valves (also known in the art as check valves, safety valves, flapper valves and ball valves or valves of similar nature) permitting isolation of wellbore fluids and facilitating return of such fluids to the surface via a tubular internalized diameter (up to and including bottom hole assemblies (BHAs)). In particular aspects, the invention relates to a new, novel and non-obvious device using individual sub-connectors which replace existing threaded pipe, and similar downhole assemblies, by utilizing a manual make-up connection (i.e., a clutch connection) for connecting joints of pipe improving on existing drill pipe and assemblies by eliminating the need to use screw threads to mate two pipes or mechanical assemblies together and requiring no significant tools other than an "Allen" wrench or screw driver type hand tool to secure the connection. In addition, the mechanical locking system is complemented by a series of pressure sensitive (elastomeric) seals that both augments the secured attachment of each sub connector to the other and creates a hermetic chamber of the vital working internalized mechanisms which shields these parts from wellbore debris and contaminants.

Functionally, the mechanical connection assembly that is the present invention relies upon a spring-loaded locking mechanism, a locking collar sleeve and interdigitation of terminal castellations to accomplish a secure, yet reversable connection, together with torque loading and load transfer, allowing for downward advancement and bi-rotational movement of drill pipes and related assemblies, in both clockwise and counterclockwise directions, without a risk of backing off (disconnecting) the assembly to which it is attached—a procedure which may prove both dangerous and costly.

A secondary aspect of the connection is the ability to prevent hydrocarbons or related fluids and gases from to returning to the surface through use of a single or multi-check valve arrangement integrated into the connection. This dual flapper check-valve arrangement may provide for servicing of the flapper carrier assembly (e.g., on the rig floor) without the need to "rig down" surface equipment in a procedure that can encompass equipment disconnection (via pipe decoupling), disassembly and movement either to the rig floor or an offsite repair facility.

The ability to eliminate threaded connections from many aspects of the oil and gas industry provides for superior joints in terms of a ergonomics, usable connections that cannot back off, elimination of specification requirements for make-up torque, prevention of mistakes, vast reduction in the risk of accident and injury and reductions in downtime (while increasing cost efficiencies) across the operational spectrum (i.e., during drilling or coiled tubing deployment through tubing intervention or drilling).

DESCRIPTION OF THE RELATED ART

Standard oil and gas practices use threaded pipe connection consisting of a "box" thread (accepting thread) on the top pipe and a "pin" thread (inserted thread) on the bottom pipe, although this configuration may be reversed. These threads permit connection to other pipe sections through pipe-to-pipe coupling via "male" and "female" sub connections, but also allows for connection to other assemblies and tools known as bottom hole assemblies (BHA).

Customarily, pipe connections are preformed by two or more oilfield personnel who work to make up a connection, male to female, of threaded pipe sections via a process called "stabbing in" with the use of large ancillary equipment in the form of chains, shackles and wrenches that are not only cumbersome but also large, heady and capable of causing tremendous harm to individuals and great damage to oilfield equipment, alike. Makeup of the pipe is achieved by pushing the connections together and rotating manually a threaded sleeve, generally in one direction, that locks both the "male" and "female" sub connections together making a joint suitable in strength and application to use in all environments for jointed connections. Whether functioning properly or, in worse case scenarios, induced to high tension and torque induced failures, such oilfield equipment has the ever-present capability of causing both life-threatening and costly damage.

The current invention provides for a system that allows pipe, coiled tubing, bottom hole assemblies, strings components, tools and equipment (and related devices) to be connected using a manual make up connection (e.g., hand make up connection) whereby no 'iron roughneck', tongs, come-a-longs, shackles, chains, wrenches (mechanical and digital) or other significant mechanical, pneumatically or hydraulically actuated systems are needed to connect two pipe joints together. What's more, a check valve assembly may be provided within the "joint" connection where this assembly may be manually retrieved, due to failed surface integrity test failure, and serviced or replaced in-situ—something current systems do not offer.

This manual makes up, in addition to freeing up rig space, removes the prime damage creating agents form the work floor and serves to offer an easy access point for valve inspection, maintenance and/or replacement. Too, the present device and method of use eliminates the need for two-man make-up and break-out, Loc-tite® on threads and "black-light"/dye penetrant inspections. And, used properly, the present invention reduces the number of dropped objects that may both become damaged or result in incurred damages—human and equipment related.

SUMMARY OF THE INVENTION

The present invention offers significant improvements over that of today's threaded pipe and bottom hole assembly systems. Whereas premium threads are required to ensure pressure integrity of the pipe connection, bottom hole assembly or tooling, the "clutch connector" mechanical assembly that is the present invention accomplishes both a secure mechanical connection and attachment and pressure integrity by use of elastomeric seals containing pressure both tubing and annular. Detrimental to today's connections is the need for heavy makeup equipment. This makeup equipment can come in many forms but ultimately provide the same end result—a tight, high-torque sealing connection. Makeup equipment to secure these threads requires heavy equipment, such as iron "rough neck" systems, are essential in correctly couple tubing to a specific torque force without damaging the tool or tubular body. These systems are expensive, heavy, hydraulically actuated, laborious and cumbersome (requiring skill and training to use efficiently and safely). Other tools such as manual rig tongs have been known to be extremely dangerous with many incidents recorded over the decades (e.g., many oilfield workers damaging or losing fingers and other body parts). Wrenches, come-a-longs and chains have been, and are still, employed to make up smaller pipe and coiled tubing assemblies. These are also very dangerous tools and techniques to implement and offer the end user little margin for error when in use. Other ways to secure threaded connections include throwing chains, strap wrenches and even bonding agents. In many of these applications the actual torque force required to secure the pipe thread connection is not recorded during thread make up and as such equipment is prone to back off and ultimately left down hole or to be retrieved (i.e., "fished out") at a later date.

The present invention eliminates the need for all of the above systems and techniques, provides for an exceptionally strong connection, increases safety to personnel "making up" and "breaking out" the connection and eliminates reliance upon unknown torque requirements for the connection (explicitly because no torque specifications are required). Additionally, customary pipe connections offer no pressure integrity within the pipe body to prevent hydrocarbon or fluid return to the surface either at a single joint connection or at multiple joint intervals—a disadvantage that the present invention seeks to rectify.

Normally a surface "Kelly" valve or ball valve or ball valve/Blow Out Preventer (BOP) system is permanently or semi-permanently installed to aid in the control and prevention of hydrocarbons return to surface. The disadvantage of the customary placement of a valve is the static nature of a valve and the relative inability to remove, service and replace the valve. In opposite, the present invention incorporates a dual flapper check valve carrier that is 'on the pipe' serviceable and can be employed at one or multiple joints. The flapper check valve can also be replaced with a ball valve system, or other similar valve, in lieu of a "Kelly" valve.

Utilization of the threaded pipe, the ultimate conduit of drilling fluid, itself suffers from several maladies that the present inventions seeks to remedy. First and foremost, threaded pipe connections have only one way to transmit torque through the string and that is in the direction of the thread machined profile, generally clockwise. This means that in the event of back torque, "stick slip" of pipe or indeed anti-clockwise rotation, the risk of "backing off" the threaded connection is not only probable but highly possible and happens regularly throughout the industry. The present invention eliminates the likelihood of thread back off due to the implementation of a manual make up assembly expressing terminal multi-castellation and purposive interdigitation on both the male and female sub connections that may be of either an odd or even number of castellations. In the event pipe problems occur, stuck pipe, sticking in the hole, and debris issues, chief among static pipes, the clutch connector assembly that is the present invention can be manipulated both in the clockwise and anti-clockwise rotational directions about the axis of the connected pipe to aid in freeing the pipe through interchanging clockwise rotation and counterclockwise rotations. This cannot be achieved with todays threaded technology due to risk of thread back-off and separation of the tubing, drill pipe, and/or bottom hole assembly.

In one preferred embodiment, the present invention utilizes an even number of castellations, in the current example eight, to support upwards of 3,700 ft/lb of torque capacity where the castellations provide for reduced loading of each machined torque face thereby reducing metal fatigue while spreading vibration wear across multiple device sections. Post machine heat treatment further bolsters the outer integrity of the castellations, as is the case with each and every other part of the assembly, to increase outer surface hardness and to greatly increase the life of each device part after regular and repeated exposure to a high realized internal and external pressure and a high frequency vibration environment. Additionally, the use of eight castellations reduces the amount of rotation needed to make up the assembly as compared to those devices exhibiting fewer castellations. What's more the castellations themselves are designed to accommodate high rate vibration from motors and agitators without concern over premature wear (due in no minor part to the above heat treatment and resultant long life in high wear horizontal environments commonly evidenced in hydraulic fracturing). In addition to the enhanced durability and stability (supra) of the castellations due to great resistance to torque and downward pressure, the interlocking locking dog mechanism responsible for maintaining the adherence of one pipe section to another or one pipe section and/or to related downhole assembly components serves the dual purpose of harboring sufficient strength to carry the assembly to increasing wellbore depths but also the locking dogs allow for high load over-pull in the event the assembly becomes stuck in hole which requires immense over-pull force to retrieve pipe from a stuck or wedged position. To this end, the locking dogs are rated to withstand a yield value of 100,000 lbs straight pull force.

In yet another preferred embodiment, in addition to and/or incorporated within the aforementioned preferred embodiment, the present invention's entire "internal chamber" (i.e., that area consisting of the area of reception of the male portion of the sub connector into the female receiving sub connector and the external functioning area (e.g., that area where the exteriorly residing locking dog are encapsulated by the locking collar sleeve) are completely hermetically sealed, via a tightly evidenced communication between connection parts and the use of internally and externally disposed elastomeric O-rings (e.g., a torus shaped gaskets), where any wellbore contamination or debris is disallowed entry to the sealed atmospheric chamber which ensures the locking dogs, hoopster spring and sub connector mating parts are continuously maintained and remain clear of obstructions. Such an area is vital in ensuring the proper functioning of the present clutch connection device and to assure ease of break out when rigging down. Additionally, this relative freedom for debris and contamination ensures the device as well will require no cleaning to release and disassemble and wards against decreasing internal pressure, during operation, caused by incomplete communication due to obstruction.

In further another preferred embodiment, the assemblage that is the present invention, in addition to the examples above, evidences a locking collar sleeve having a four start thread machined into the locking collar sleeve ensuring the ease, speed and efficiency of engagement of the connector make-up which requires only a one-quarter turn to engage the locking collar sleeve with the exterior of the female portion thereby decreasing the dexterity and accuracy requirements of the operator while also decreasing the difficulty and required time for completing the task of finalizing and securing attachment of the male and female sub connector portions. Post engagement, it is clear that the primary functionality of the locking collar sleeve, once advanced upon the outer thread of the female collar, is to push the locking dogs into the mating recess of the male pin assembly thereby locking the pin and mandrel together via the depressed locking dog mechanism. The position of the locking collar sleeve onto the outer female exhibited collar, with no connection to the pin assembly, provides for a zero-loading design whereby the locking collar sleeve is not exposed to any mechanical forces from the upper mandrel (female) or lower pin (male) assembly other than tubing and annulus pressure effects. What's more the locking collar sleeve provides for a mechanical means to both join the male and female sub connectors and to separate the mandrel (female) and pin (male) connections in the event debris or seal sticking were to prevent the connection from separating. To separate the connection simply apply a 'C' spanner to the holes provided in the lower section of the locking collar sleeve and turn anti-clockwise to the stop on the opposing load shoulder. Once on the load shoulder continues turning with the 'C' spanner, anti-clockwise, and the upper and lower connectors are mechanically separated, the 0 rings will come "off seat" allowing ease of separation.

In another embodiment, the principal means of connection, the locking dogs, may be forced to their naturally deposed outward position through hoopster springs, which potentiate the perpendicularly, sustained movement and orientation of the locking dogs. It is thus the decreased diameter experienced by the locking dogs, due to the advancement of the sleeve upon the outwardly disposed thread about the neck of the female collar, that works to act against the outward pressure created by the hoopster rings on the locking dogs in an opposite direction and causes the locking dogs to move inward (opposite the locking dogs outward projecting state) toward communication with the recessed neck of the male sub connector. Once the sleeve has upwardly rotated to a point where no further advancement is possible, a plurality of set screws may be used to secure and lock the sleeve to the female sub connector via an accepting grove about the circumference of the female sub connector, externally.

In operation, the device that is the present invention may be pre-attached to BHA assemblies at the facility workshop where correct ft/lbs torque can be applied to the specific thread connection, generally 2⅜" PAC for 2⅞" assemblies. If a workshop connection is not feasible, an onsite field connection may be achieved, preferably, while the BHA components are on the ground prior to attempting coupling. This assures that there is no risk of dropped objects above any recommended height and that the connection can be secured at ground level safely. Once the appropriate male and female sub connectors are connected or "made up" and vertical, the relevant BHA components can be mated, either by applied mechanical force or gravity, where the castellations of both male and female sub connectors are interdigitated (which may be further facilitated through a slight rotation of either upper and lower section or both). The male and female sub connectors should then be checked to ensure that each is properly seated, via insertion of corresponding castellations into accepting recesses on the opposite sub connector, and that connection is complete prior to engaging the locking collar sleeve. As a primary safety feature, the locking collar sleeve is incapable of engaging the exteriorly residing thread about the female sub connector if the sub connectors are not in full communication, flush, interdigitated and in their proper orientation. Once the completely and properly aligned connectors are engaged, and the locking collar sleeve communicates with the exteriorly residing thread, the sleeve is capable of advancing to termination—advancement accomplished through "C" spanner wrench or by hand, the later preferable as to not tighten to the point of difficult removal or to apply excessive torque force. A set of four set screws are then advanced (via an Allen wrench) through receiving holes and adhere the locking collar sleeve to a female sub connector annular groove. Loc-tite® may be applied to each set screw prior to screwing. The assembly is now ready for deployment.

Retrieval is accomplished by (1) withdrawing pipe sections from the borehole, (2) visually inspecting the connections for damage or missing components, (3) resting the end of the BHA on the ground to avoid dropping, (4) unscrewing the set screws, (5) unscrewing the locking collar sleeve (by hand or 'C' spanner) only to the stop shoulder but not past the final loosening revolution and (6) retightening one or more set screws as to not allow the locking collar sleeve to drop prior to disconnection of male and female parts. Important to note with disassembly is the immense pressure(s) profile with which the assembly is operated. If the locking collar sleeve is extremely tight, the operator is wise to make sure the BHA is on the ground (thereby removing carrying load from the locking dogs) and that there is no trapped pressure within the device.

In yet a final preferred embodiment the present invention the following specifications for the clutch assembly have been noted to be functionally ideal:

| Dimensions | | |
| --- | --- | --- |
| OD | 2.875" | 3.125" |
| ID | 1.062" | 1.062" |
| OAL | 13.50" | 13.50" |
| Box thread | 2⅜" PAC | 2⅜" PAC |
| Pin Thread | 2⅜" PAC | 2⅜" PAC |
| Elastomers | Viton | Viton |
| Ball Passage | 1.00" | 1.00" |
| Operating Envelope | | |
| Pressure Rating | 15,000 psi | 15,000 psi |
| Temperature Rating | 400 F. | 540 F. |
| Compression (lbs) | 60,000 | 100,000 |
| Tensile (lbs) | 79,000 | 98,000 |
| Yield (lbs) | 109,000 | 139,000 |

-continued

| Torque (ft/lbs) | 2,100 | 4,000 |
| Material (110K) | 4140 HT | 4140HT |

Distinctly, the present invention allows for (1) expedient and efficient makeup and breakout of connections, (2) more secure mechanical and pressurized sealing (3) ease of servicing and replacing valves, (4) more effectual torque loading and torque distribution (5) safer pipe joint, bottom hole assembly and/or tooling accessories handling and (6) the ability to manipulate and rotate pipe in both a clockwise and counterclockwise manner for bi-directional control in freeing stuck or wedged pipe. It is for the above reasons, coupled with deficiencies of the art in the field, that inventor seeks to cure the cited insufficiencies while addressing the significant, long felt and unmet need for a useful and novel clutch connection joint assembly device and method for use.

BRIEF DESCRIPTION OF THE DRAWINGS

The advantages and other aspects of the invention will be readily appreciated by those of skill in the art and better understood with reference to the accompanying drawings in which individual features are designated and depicted, alone and in combination with reciprocal elements, throughout the several figures of the drawings.

DETAILED DESCRIPTION OF THE PREFERRED EMBODIMENTS

Advantages of the present invention will become readily apparent to those skilled in the art from the following detailed description, wherein there is described in detail certain preferred embodiments of the present invention (and examples for illustrative purposes). Although the following detailed description contains many specific features for the purposes of illustration, one of ordinary skill in the art will appreciate that many variations and alterations to the following details are within the scope of the invention. Accordingly, the following embodiments of the invention are set forth without any loss of generality to, and without imposing limitations upon, the claimed invention. While embodiments are described in connection with the specification herein, there is no intent to limit the scope to the embodiments disclosed below. On the contrary, the intent is to cover all alternatives, modifications, and equivalents.

Figure 1:
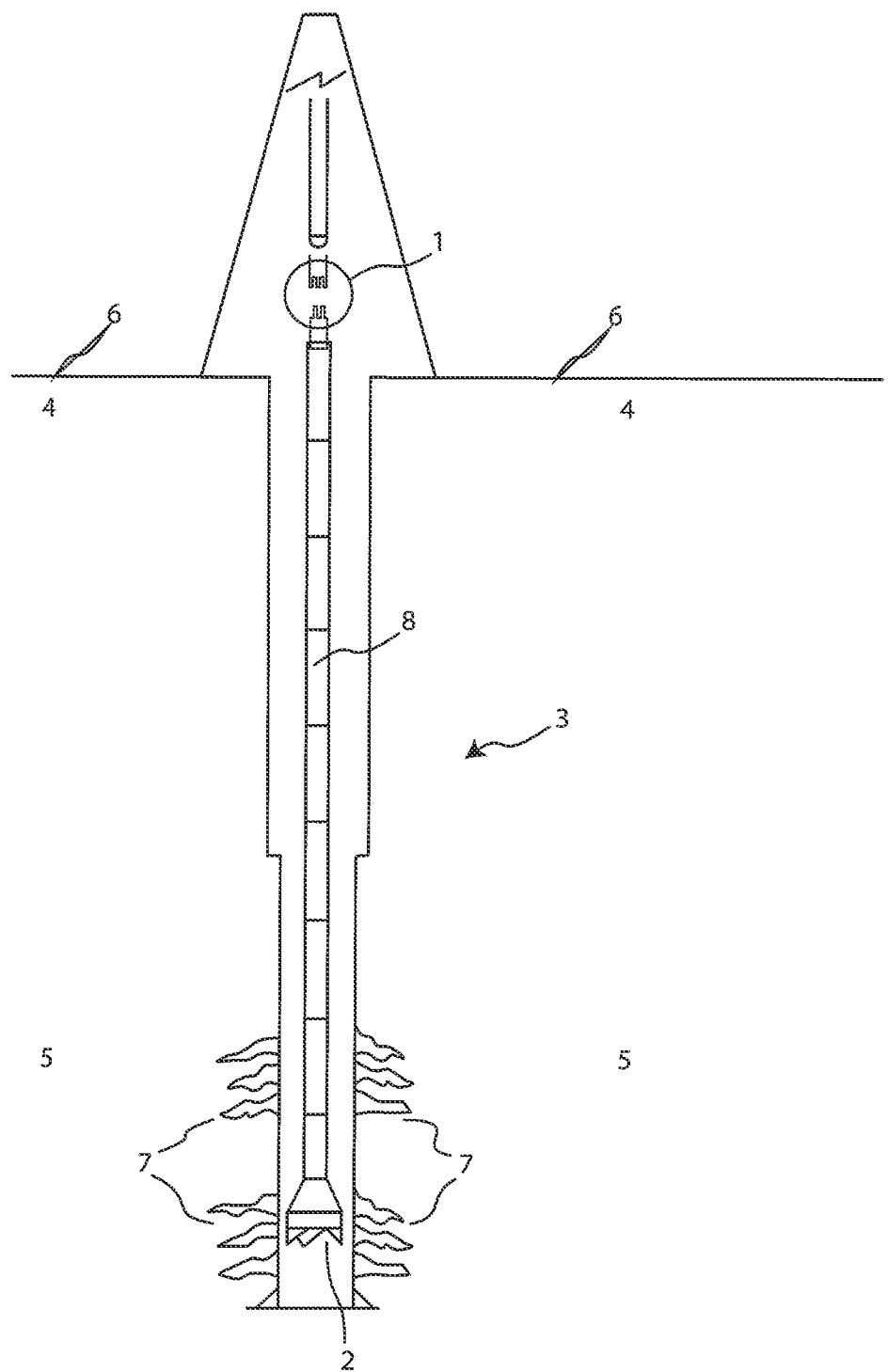
FIG. 1 illustrates an exemplary wellbore drilled through the earth down to a hydrocarbon-bearing formation together with a schematic view of joint coupling through castellation interdigitation.

FIG. 1 illustrates the present invention that is the clutch connector assembly 1 and exemplary wellbore 3 which has been drilled through the earth 4, via a drill bit 2 attached to a drill string 8 down to a hydrocarbon-bearing formation from the surface 6. Perforations 7, of a type known in the art, extend through the well bore 3 and outwardly into the formation 5 to permit hydrocarbon production fluid to flow from the formation 5 to the interior of the wellbore 3 for ultimate extraction.

Figure 2:
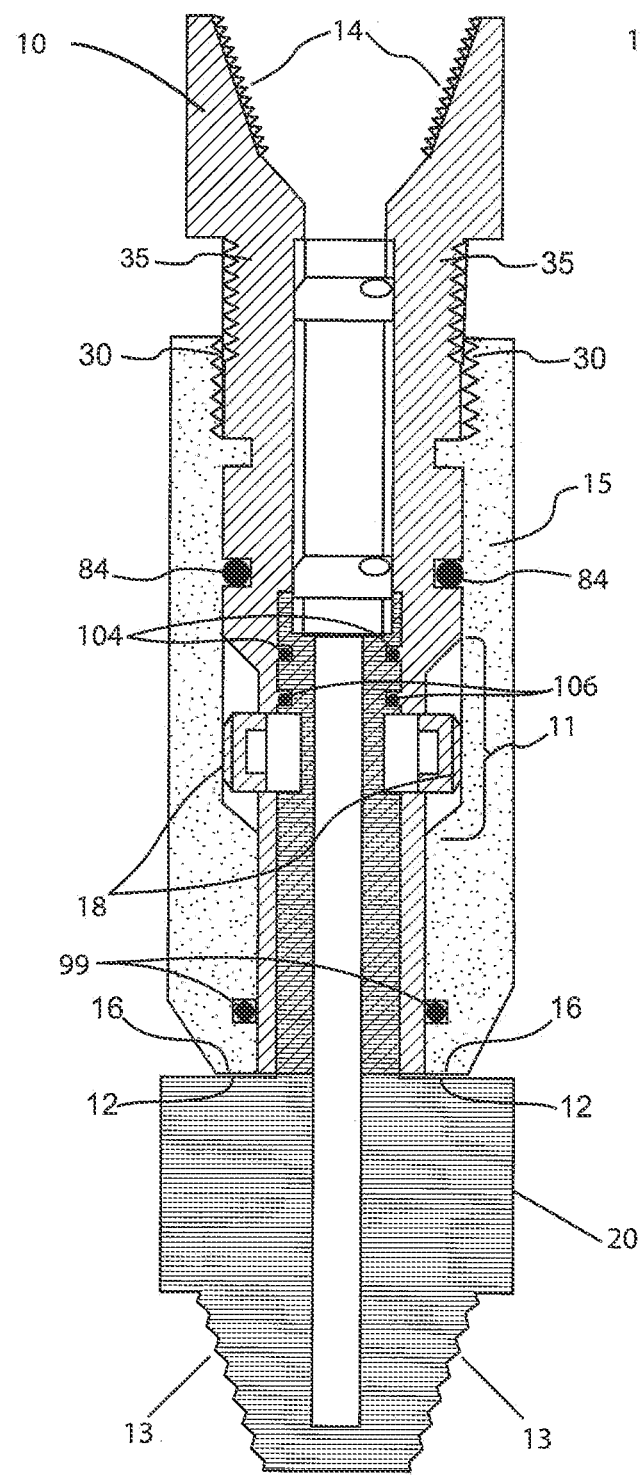
FIG. 2 is a schematic cross-sectional view of the clutch connector assembly in an unsecured position with the sub connectors in communication and locking collar sleeve incompletely engaged just prior to locking collar sleeve advancement upon the exterior threaded portion of the female sub connector.

FIG. 2 provides for a schematic of a clutch connector assembly 1, that is the present invention, in a partially engaged orientation (with male sub connectors 20 and female sub connectors 10, respectfully, engaged and outer locking collar 15 as yet only initially and partially screwed into an advancing position that allows either (1) cross-over (i.e., retrofitted attachment), onto existing pipe, via a 'clutch' joint connection (depicted), or (2) an integrated system into newly manufactured pipe that allows for make-up of individual pipe joints, coiled tubing pipe joints, bottom hole assemblies, and/or tools and equipment utilizing the assembly male sub connector 20 and female sub connector 10 of clutch connector assembly 1 (not shown). The former, retrofitted existing pipe connection is accomplished via attachment of an exterior threaded "pin" of a customary drill pipe (not shown) with an interiorly threaded ("box") portion 14 on the female sub connector 10 at a point most distal to the physical point of clutch connector connection of the clutch connector assembly 1 male sub connectors 20 and female sub connectors 10. Similarly, male sub connector 20 is made to mate with the interiorly threaded portion ("box thread") of traditional drilling pipe, coiled tubing, downhole assemblies and tools and equipment (not shown), via a "pin", threaded connector 13 which communicates directly with the "box" portion of traditional pipe, tubing and/or downhole assemblage. Further, the exhibition of threading can be reversed, where female sub connector 10 can be constructed to exhibit an exteriorly threaded "pin" mating portion (similar to the exteriorly threaded "pin" distal portion 13 of male sub connector 20) and the male sub connector 20 can be constructed to exhibit an interiorly threaded "box" mating portion (similar to the interiorly threaded "box" mating portion 14) by way of facilitating a universal functionality without departing from the spirit and scope of the invention. The later system, consisting of newly manufactured pipe, can be manufactured directly into piping, coiled tubing or bottom hole assemblies, tooling and accessories (not shown) without the need for various means of attachment (e.g., iron rough necks, pipe wrenches, and/or mechanical and hydraulic make-up tools) and/or "pin" and "box" threading which would obviate any inclusion of male to female threading, via "box" and "pin" mating portions of female sub connectors 10 and male sub connector 20 to threaded portions of existing pipe in the construction and manufacture of a pipe joint connection. It can be further observed that the outer locking collar sleeve 15 (in the form of an annular rotating sleeve) exhibits an interior space 11 that is adequate for receiving the open conformation of the interlocking "C" spring-loaded locking dogs 18 which are reversibly abutted to the confining interior space 11 via outwardly positive pressure extending perpendicular and outward (via compression springs) away from the midline of assembly 1.

Figure 3:
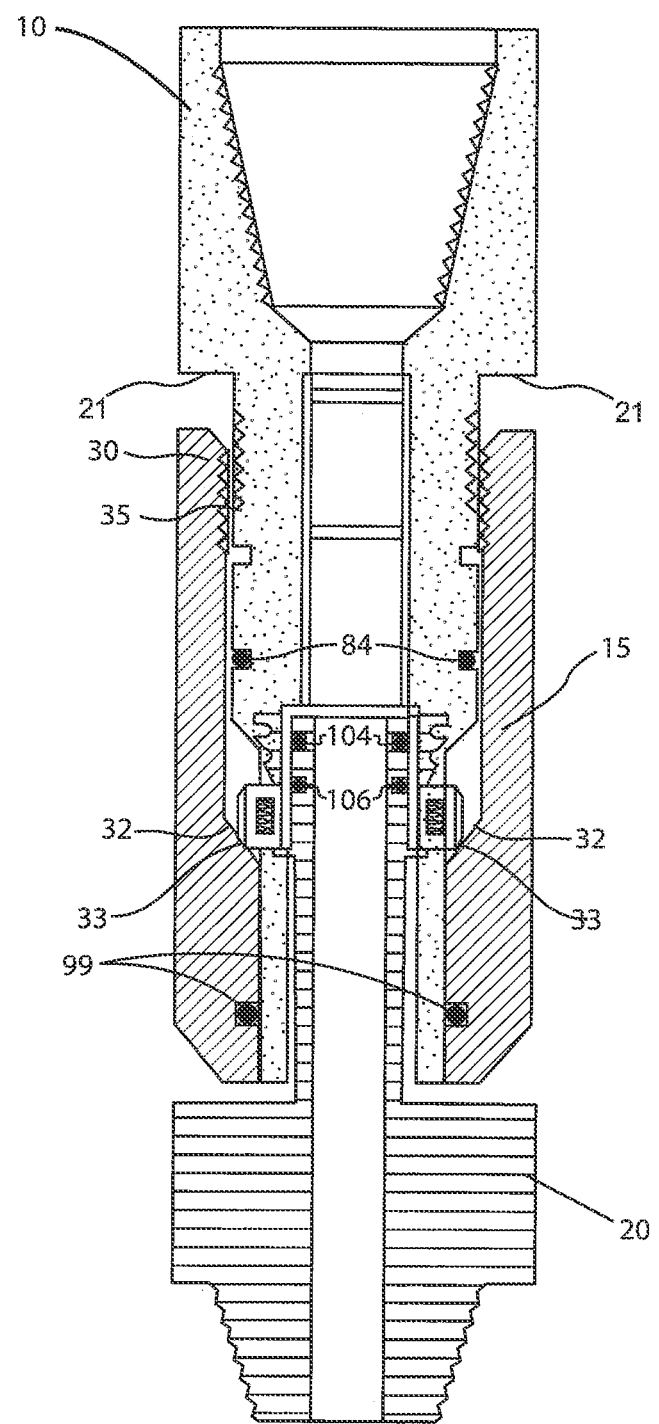
FIG. 3 is a representational cross sectional view of the present invention in a position where the locking collar sleeve is partially engaged as it is advanced upon the exterior thread of the female sub connector just prior to locking dog depression.

As depicted in FIG. 3, the outer locking collar 15 displays an internal "box" threading that is made to advance toward the distal, recessive neck 21 of female sub connector 10 via advancing or "screwing up" of the internalized helical ridge 30 of locking collar sleeve 15 along and in congruence with a helical ridge about the exterior "male" thread 35 of the female sub connector 10. This upward advancement allows the beveled interior inclined ridge 32 (and resulting decreased interior diameter) of the outer locking collar sleeve 15 to communicate with the lower tapered loading face 33 of each spring-loaded locking dog 18, gradually, where each beveled locking dog sloped surface 33 is made and designed to receive the opposite angled, corresponding slope of the beveled interior inclined ridge 32 reciprocally for (1) ease of advancement and (2) decreased wear imposed by continual use.

Figure 4:
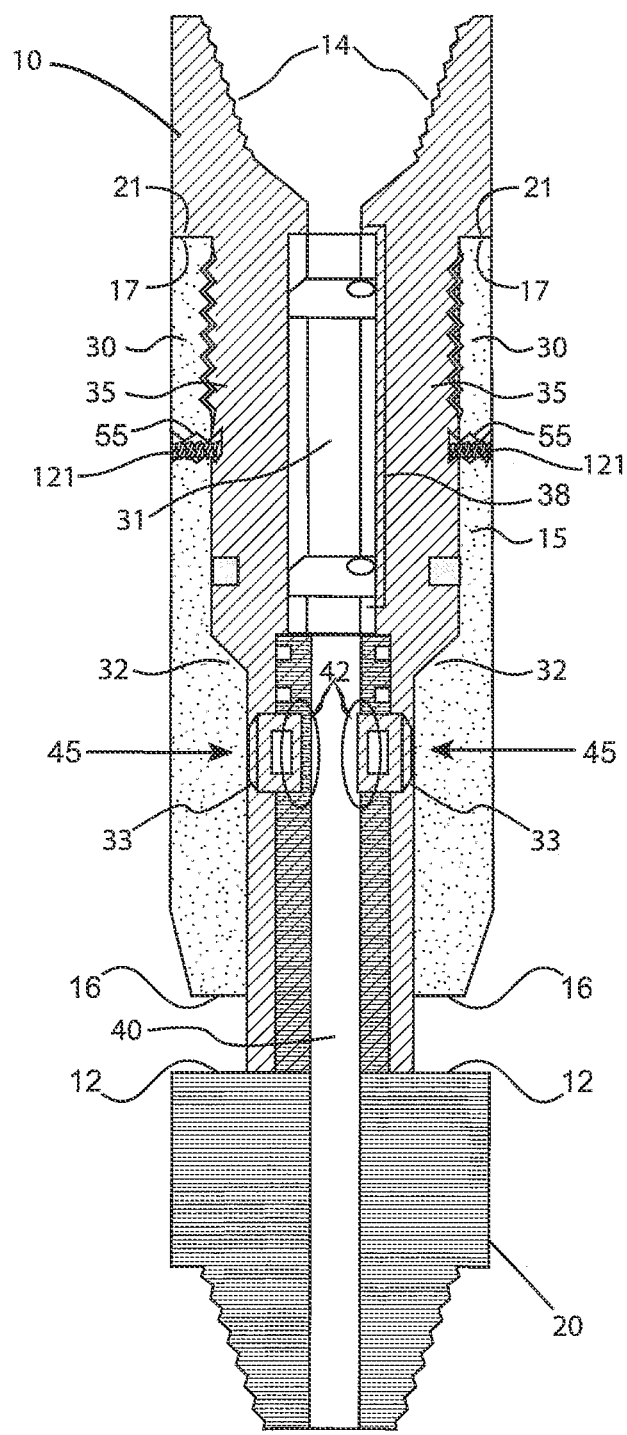
FIG. 4 is a schematic cross-sectional view of the present invention in a fully engaged position with sleeve fully tightened and locking dogs depressed inwardly to interlock locking dogs with male sub connector recessed neck.

FIG. 4 illustrates complete advancement of locking collar sleeve 15 to its most terminal advanced position where the locking collar sleeve 15 exhibits complete communication between the internalized helical ridge 30 of locking collar sleeve 15 and external helical ridge about the exterior "male" thread 35 of the female sub connector 10 to the point where top annular ridge 17 of locking collar 15 and distal, recessive neck 21 of female sub connector 10 are contiguous and further advancement is halted by their contact. Advancement to this most terminal position allows the lower tapered loading face 33 of each spring-loaded locking dog 18 to slide along the internal annular beveled surface 32 of locking collar sleeve 15, gradually, where the internal diameter of the locking collar 15 decreases as the locking collar sleeve 15 is advanced causing the locking dogs 18 to become depressed inwardly 45 toward the centrally disposed annular channel 40 of the male sub connector 20 and made to engage the circumferential recess 42 exhibited in the proximally inserted neck region 48 of the male sub connector 20 (as seen in FIG. 7C), inwardly, in the direction 29 of FIG. 9. Clutch connector assembly 1 is now said to be in a fully confirmed configuration that is ultimately secured via a plurality of set screws 121 (illustrated in FIG. 4 and FIG. 11A), whereby the locking collar sleeve 15 is maintained in the locked position via actuation of each of four set screws 121, individually placed in a reciprocating orifice 55 at a 90 degree from one another which are installed to prevent the locking collar sleeve 15 from backing off due to vibration and/or rotation.

Figure 5:
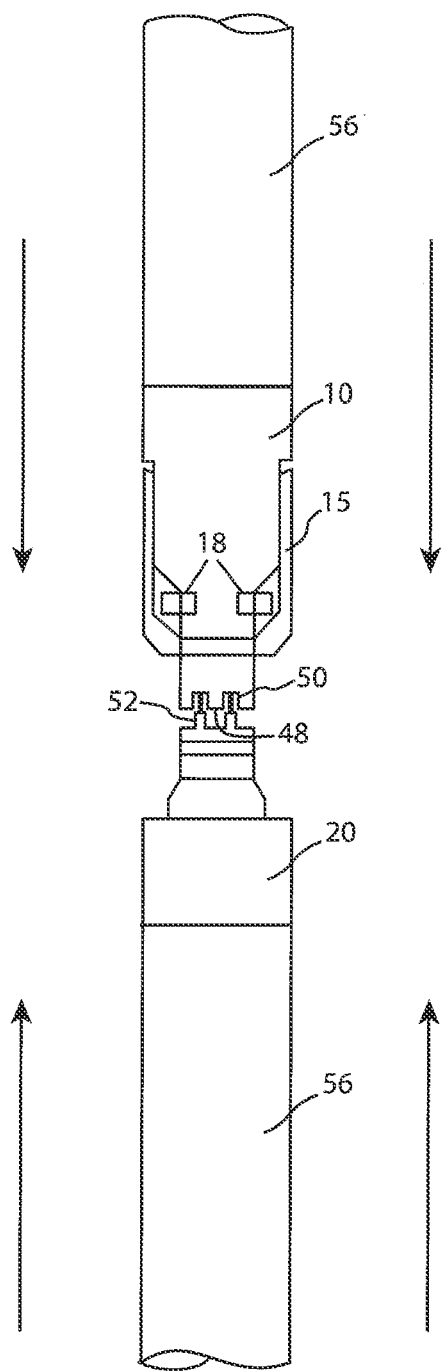
FIG. 5 depicts a representation of a pipe joint with male and female sub connectors approaching castellation connection prior to joining.
Figures 8A, 8B:
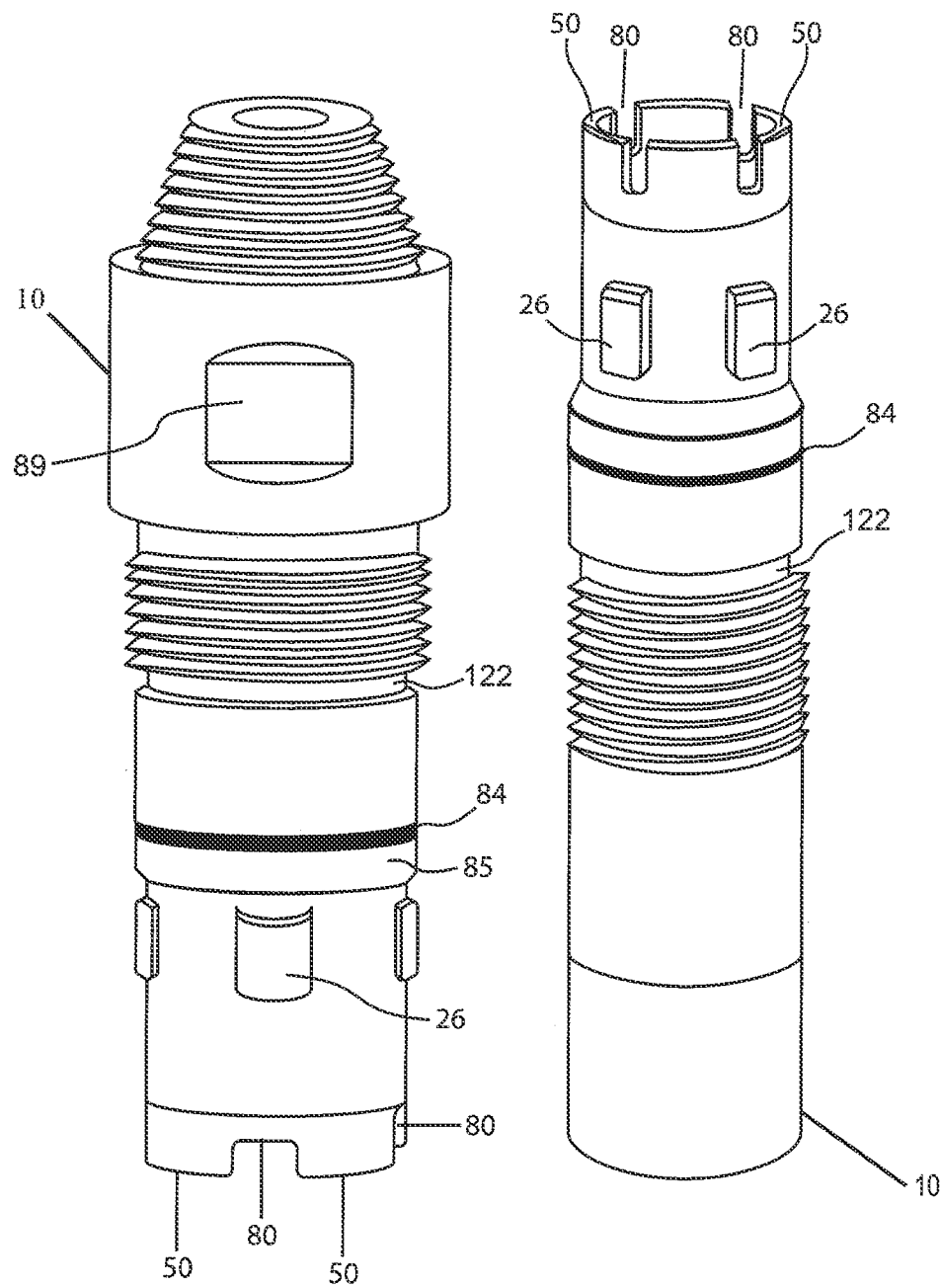
FIG. 8A is the female receiving sub connector of the present invention in the downward facing orientation.
FIG. 8B shows the female receiving sub connector of the present invention in the upright facing orientation.

Evidenced in FIG. 5, the clutch connector assembly 1 is presented in a partially engaged confirmation, wherein the present invention is exhibited as a retrofitted or integrated joint connection into a drill pipe 56, wherein the upper female sub connector 10 and the lower male sub connector 20 are disengaged and moving toward one another into close proximity (as indicated with arrows)—where the neck region 48 of the male sub connector 20 is partially inserted into the receiving portion of the female sub connector 10 and the upper castellation 50 (cut across the thickness of the lower circumference of the female sub connector 10) is oriented in such a way as to be accepted by the recess 102 between the lower castellation 52 (about the outer circumference of the male sub connector 20) and the lower castellation 52 accepted into recess 80 (see generally FIGS. 8A and B, 10B and 12A). Equally, it is noted that the locking collar 15 is as well disengaged where the locking dogs 18 are extended away from the assembly midline in an outwardly disposed, extended resting state.

Figure 6:
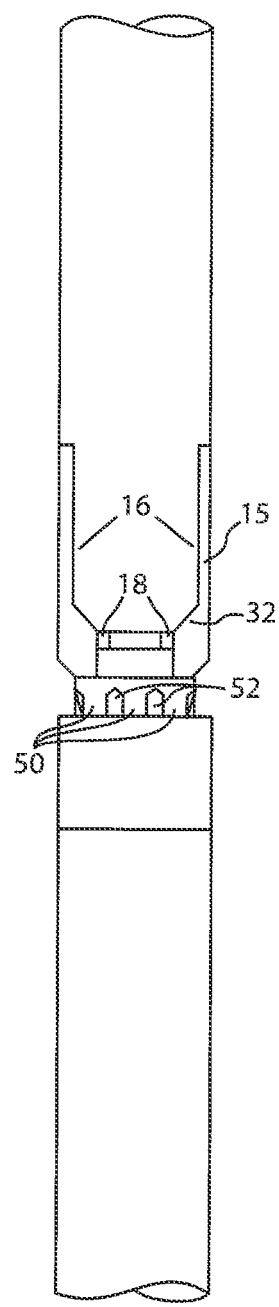
FIG. 6 represents a pipe joint with male and female sub connectors connected, locking logs engaged, castellations joined and locking collar in a fully tightened position.

FIG. 6 depicts an engaged clutch connector assembly 1 wherein the upper connection female sub-connector 10 and the lower connection male sub connector 20 (which may be reversed) are fully engaged and in immediate proximity to one another through castellation interdigitation. The neck region 48 of the male sub connector 20 is completely internalized into the receiving portion of the female sub connector 10 (not shown) and the upper castellations 50 (created via indenting the full thickness of circumference of the female sub connector 10) is oriented in such a way as to be accepted by the recess 102 created by the borders of lower castellations 52 (exhibited in a raised manner about the outer circumference of the male sub connector neck region 48 in FIG. 10B). Specifically, the castellation exhibited by the male sub connector is permanently fixed (machined onto), and raised above the annular circumference of the base of male sub connector neck 48, albeit at an increased diameter relative to the male sub connector neck, and the castellation of the upper female sub connector is comprised of recesses 80 "cut into" the formed "pipe" (as shown in FIGS. 8A and 8B) where castellation projections 50 on the upper connection female sub connector 10 are made to communicate with the recesses 102 of the lower connection male sub-connector 20 and the castellation protuberances 52 on the lower connection male sub connector 20 are made to communicate with the recesses 80 of the upper connection male sub connector 20 in such a fashion as to create a mechanical coupling that brings the neck region 48 of the male sub connector 20 into an extremely close, flush immediacy with the inner diameter of the female sub connector as to create an area averse to fluid and debris infusion. Equally, it is noted that the locking collar sleeve 15 is as well engaged where the locking dogs 18 are extended inward toward the assembly midline, via depression by the circumferentially narrowing diameter and the beveled interior ridge 32 of the outer locking collar sleeve 15, in an engaged state with the recessed neck portion 42 of the male sub connector 20 of the clutch connector assembly 1. The annular indention that is the neck region 48 of the male sub connector 20 is, in addition, bordered both above and below by corresponding "shoulders" that serve as an occlusive area, just smaller than the inner receiving circumference of the female sub connector 10, to disallow the entrance of well containments and debris.

Figure 7A:
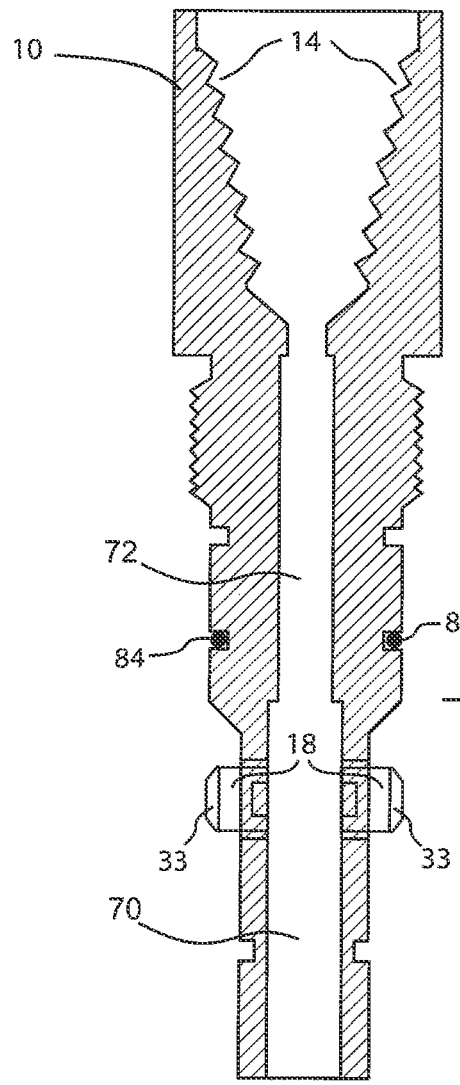
FIG. 7A illustrates the individual female sub connector.
Figure 7B:
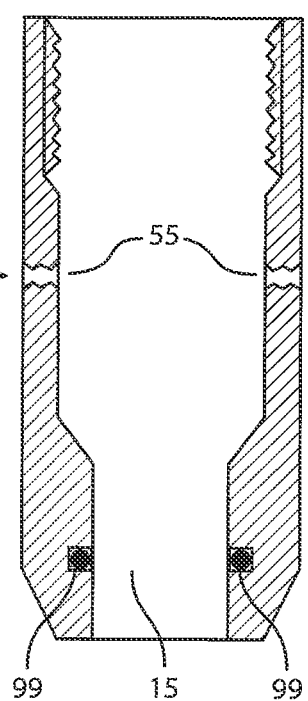
FIG. 7B shows a locking collar.
Figure 7C:
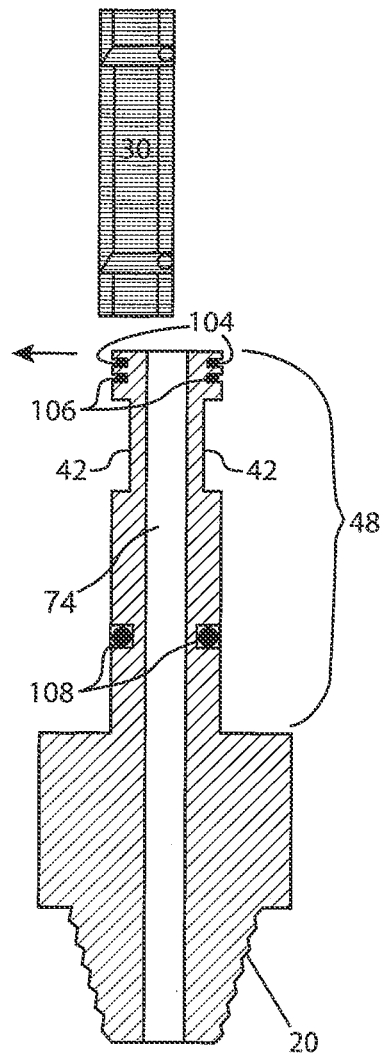
FIG. 7C depicts a male sub connector.

FIGS. 7A-7C illustrate a diagrammatic representation of the individual (disengaged) components of the clutch connector assembly 1 consisting of a male sub-connector 20, a female sub-connector 10, a securing, reversibly "tightening" locking collar sleeve 15, and an optionally inserted valve 30. Of particular importance is both the (parallel) relation of neck region 48 recesses 42 to extended locking dogs 18. As can be seen, the female sub connector exhibits two internalized diameters—an internal diameter 70 that is made to communicate and accept the externalized neck region 48 of the male sub connector 20 and a smaller diameter 72 corresponding to a circumferentially equivalent internal diameter 74 of the male sub connector, at the point where the most terminal distal portion 110 (FIG. 10 A) of the male sub connector 20 communicates with an internalized shoulder 75 (FIG. 9 A) created at the junction of diameters 70 and 72, thereby maintaining a uniform cylindrical "sealed" space and a congruent, uniform diameter between each communicating sub connector.

FIG. 8A shows a downward oriented illustration and FIG. 8B shows an upright oriented illustration of the female subunit 10 where the extension portions of castellation 50 of the female connector sub-connector 10 are a result of manufactured incursions 80, uniformly and axially cut into and through the thickness of the annular shape of the most terminal section of female sub-connector 10. In opposite, in FIG. 10 B, the castellations 52 of the male connector sub-connector 20 are a result of exteriorly residing raised protuberances, extending out and away from the annular radius of the inserted base portion of male connector 20, about the radius of the mid-portion of male connector sub-section 20, allowing for a flush acceptance of inserted male connector sub-portion neck region 48 into the female connector sub-connector 10 and resulting torque loading and locking of the clutch connector assembly 1 which facilitates both a clock wise and counter clockwise rotation during operations. This interdigitation impedes the connection "backing off" experienced with traditional threaded tubing and related assemblages as the two sub connectors are coupled via the described mechanisms and not unidirectional threading. What is more, the castellation 52 about the male connector sub-section 20 is permanently fixed, and machined onto, the diameter of the male connector sub-connector 20 providing unparalleled mechanical acceptance and support of the female castellations and permitting the weight and load of tubing, once interdigitation reaches a static placement at their terminal points, to distribute about the perimeter of the connector assemblage and not within the tubular annulus. Further depicted, is receiving area 89 (which corresponds with receiving area 123 on male sub connector 20 of FIG. 10) wherein threaded pipe, or similar downhole equipment (e.g., bottom hole assemblies) can be attached, tightened, loosened and removed from said clutch connector assembly 1 via applied wrench pressure.

As seen in FIGS. 9A-9F, FIG. 9A shows a cross sectional view female sub connector 10 and a smaller diameter 72 wherein housing windows 39 are set at 90 degrees from one another wherein locking dogs 18 (in FIGS. 9B, 9C, 9E and 9F each is removed from their female sub connector 10 housing windows 39) giving an unencumbered view of the locking dogs 18 and their inwardly and outwardly reservable confirmations with affixed semi-circular compression springs 19 (see FIGS. 9B and 9C) where locking collar sleeve compression, inwardly 29, against an outwardly spring-induced force, creates an inward movement toward the hollow body 29 of the clutch connector assembly 1, as shown in the bottom left illustration (FIG. 9D), where the locking dogs 18 are made to communicate with the male connector sub-portion neck region 48 (not shown) of the male sub connector 20, laterally. The locking dogs 18 themselves are configured to exhibit a largely flat exterior surface 26 (which may also be slightly convex) conforming to the annular shape of the outer circumference of the female sub connector 10, outwardly, and a concave surface 28, interiorly, which is made to correspond to the curved convex exterior and concave interior of the female sub connector 10. Additionally, each locking dog 18 harbors a stationary tab 37 designed to maintain the locking dog 18 in an outward orientation without allowing the locking dog 18 to exit the locking dog window 39 completely. In effect, the interlocking springs 19 generate an outward force upon the locking dogs 18 that is only halted by the abutting of the stationary tabs 37 against the interior of the female sub connector's interior surface which creates a semi-permanent suspended state that is only reversed with the application of pressure by the locking collar sleeve 15. As the locking collar sleeve 15 is moved in a clockwise and upward ("tightening") direction, the beveled interior inclined ridge 32 of the locking collar sleeve 15 is made to contact the locking dogs 18 through a decreasing internal diameter that engages and activates the locking dogs 18 thus moving them inwardly to engage an inserted male sub connector 20 about its receiving neck region 48, mechanically. To facilitate the actuation of the locking dogs 18, the surface of the individual locking dogs, themselves, exhibit a beveled surface 33, in the opposite direction from the beveled interior inclined ridge 32 of the locking collar sleeve 15 to facilitate a guided locking dog 18 depression (and release) through reciprocal tapering of each face—on the receiving, beveled edges above and below each locking dog 18. Moreover, the top left cross-sectional view shows windows 39 that are created across the thickness of the receiving portion of the female sub section 10 for the insertion of the interlocking spring-loaded locking dogs 18 via inwardly attached interlocking springs 19 that may display arms that are uniform in length or offset (see generally FIGS. 9A-9F), where one spring arm is longer than the other allowing one arm to function more for placement and securing (i.e., the shorter arm) and less for outward actuation and the other arm (i.e., the longer arm) less for placement and securing and more for the creation of tension—yet each working toward all three functions in varying degrees.

Figure 10A:
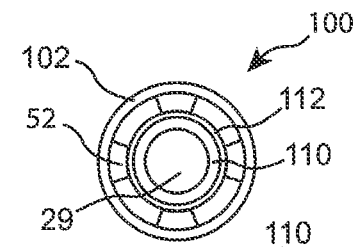
FIG. 10A is a depiction of a top view of a male sub connector section of the present invention.
Figure 10B:
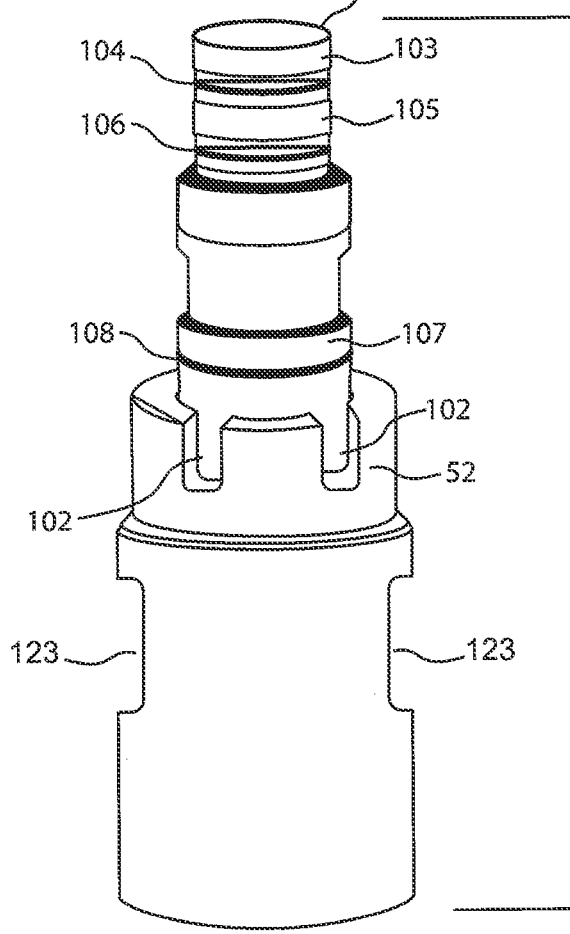
FIG. 10B is a side view of a male sub connector.
Figure 10C:
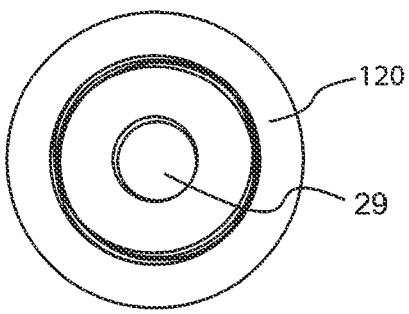
FIG. 10C is a bottom view of a male sub connector.

FIG. 10 A illustrates a top 100 view, FIG. 10 B a side male sub connector 20 view and FIG. 10 C a male sub connector bottom 20 bottom 120 view of the male sub connector section 20 where raised castellations 52 and resulting recessed indentions 102 create a gripping interdigitation (with the "finger-like" castellation 50 and resulting recesses 80 of the female sub connector 10) that allows for bi-directional rotation of the clutch connector assembly and the transfer of load bearing weight on the externally residing, structurally sound portion of both male sub connectors 20 and female sub connectors 10, during decent. Upon ascent, this load is transferred away from the externally residing portion of both male and female sub connectors to the locking dogs 18.

Figure 11A:
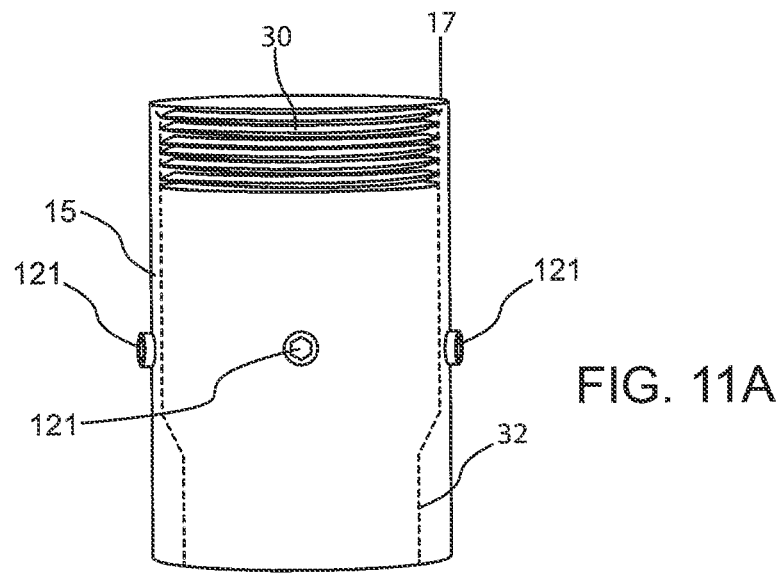
FIG. 11A illustrates the connection sleeve and securing mechanism of the present invention detached.
Figure 11B:
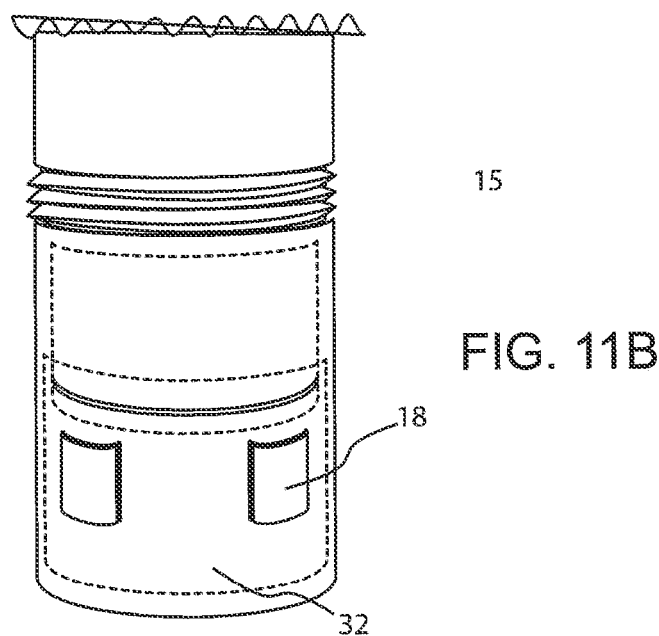
FIG. 11B shows an attached connection sleeve and securing mechanism of the present invention.

FIG. 11A shows the outer locking collar 15 in a free-standing (top view) and, in FIG. 11B an affixed orientation (bottom view). FIG. 11A free standing, top view, depiction evidences a top annular ridge 17, for providing for its ultimate terminal "tightened" position, an internalized helical ridge 30 for clockwise rotation (i.e., tightening right and upward), together with beveled interior inclined ridge 32 creating a graduated, decreasing diameter, that makes up the primary functional components for the advancement of the "sleeve-like" locking collar 15, the actuation and securing of the locking dogs 18 to the circumferential recess 42 of the neck region 48 of the male sub connector 20 and the final securing and locking of the male connector sub-section 20 to the female connector sub-section 10. Moreover, as depicted in FIG. 11A, securing screws 121 (displayed, for representational purposes, to receive the hexagonal face of a manually operated Allen wrench, but may be of any tightening screw set) are placed at 90 degrees from one another for the securing of the locking collar 15 to the female sub connector 10 at the recessed groove 122 of FIGS. 8A and 8B to prevent unwanted loosening or disengagement due to rotation or vibration. FIG. 11B, engaged, bottom view, illustration shows the outer locking collar 15 in a partially engaged confirmation with locking dogs 18 in communication with the beveled interior inclined ridge 32 and narrowed internal diameter of locking collar 15, locking dogs 18 actuated inward, and both male sub connector units 20 and female 10 engaged (male sub connector unit 23, internalized and not graphically depicted) to permit bi-directional torque loading during operations such as drilling. It should be noted that rotations of the locking collar sleeve 15 in the anti-clockwise (i.e., loosening and downward) direction will permit "unlocking" of locking dogs 18 thereby unlocking the male sub connector 20 and female sub connector 10 of the clutch connector assembly 1 from one another for disassembly from the pipe, coiled tubing bottom hole assembly or tools.

Figure 9A:
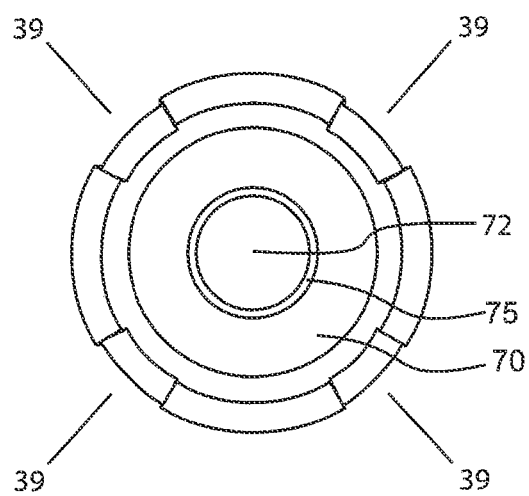
FIG. 9A is a depiction of the male sub connector within the female sub connector.
Figure 9B:
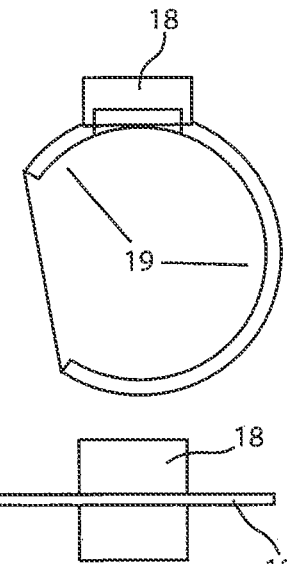
FIG. 9B illustrates a top view of a single locking dog.
Figure 9C:
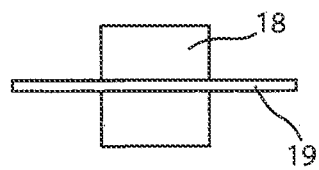
FIG. 9C shows a side view of a single locking dog.
Figure 9D:
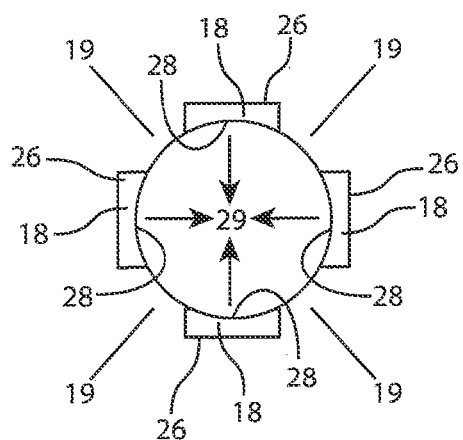
FIG. 9D is a complete spring-loaded, locking dog mechanism.
Figures 9E, 9F:
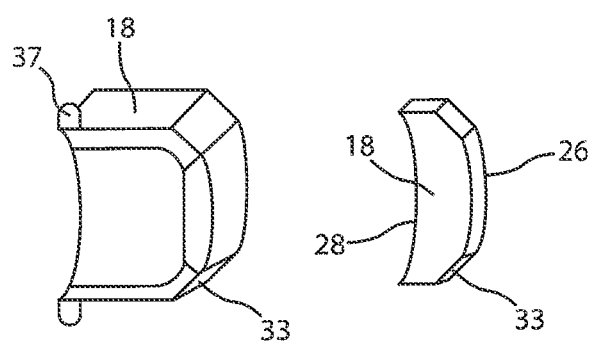
FIG. 9E is the beveled head of the entire length of a locking dog.
FIG. 9F displays a truncated locking dog with beveled edges.

A locking dog 18 affixed spring-release 19 mechanism, represented in FIGS. 9B through 9D, is integrated and assembled into the locking dogs 18 (at equal or differing heights within the internal circumference of female sub connector 10 and larger diameter 70, in direct communication, overlapping or straddled) will apply a constant force, outwardly, on the locking dogs 18 in a natural or rested state. When the locking collar sleeve 15 is released in the (left-turning and downward) anti-clockwise position, the spring release mechanism 19 forces the locking dogs 18 outward away from the circumferential recess 42 of the neck region 48 of the male sub connector 20 of the male locking and into interior space 11 of the locking collar 15 thereby enabling the male sub connector 20 to be released from the female sub connector 10 in a coupling reversal.

In the event the male sub connector 20 and female sub connector 10 of the clutch connector assembly 1 become difficult to uncouple, the locking collar sleeve 15 can be used to force the separation of the two subunits whereby the male sub connector 20 and female sub connector 10 may be 'jacked' apart due to the configuration of external threading and its relation to the length of the locking collar sleeve 15 and ability of the locking collar sleeve 15 to exert pressure upon the load bearing shelf 12 of the male sub connector 20 as depicted in FIGS. 2-4, 7C and 10B. During normal operations, the locking collar sleeve 15 is designed to serve the dual functions of (1) reversable securing and attachment of male sub connector 20 to female sub connector 10 (through the actuation and engagement of locking dogs 18 into the recessed neck region 42 of the male sub connector neck 48) and (2) by extending the externalized threading 35 about the locking collar receiving circumference of the female sub connector 10 to a point where the locking collar 15 remains in threaded contact with the externalized threading 35 while abutting the load bearing shelf 12 of the male sub connector 20 thereby "forcing" the separation of male sub connector 20 from female sub connector 10 via the final decoupling turns of the locking collar sleeve 15—resulting in a downward force and obligatory decoupling of the two connector subunits.

In addition to the aforementioned interlocking mechanical structures, as detailed and described above, the system does, as well, exhibit a number of elastomeric seals, elastomeric seal 84 disposed externally and circumferentially about female sub connector 10, elastomeric seals 104, 106, and 108 disposed circumferentially about the exterior circumference of the male sub connector 20 and elastomeric seal 99 internalized within the lower third of the clocking collar sleeve below the beveled interior inclined ridge 32 ensuring tubing to annulus seal integrity and each elastomeric seal potentiating obfuscation of possible infiltrating (hydrocarbon) well contaminants (see generally FIGS. 2, 3, 7A-C, 8A-B, and 10B). These secondary connection and chamber sealing mechanisms are pressure sensitive and naturally expand, due to their elastomeric expansion properties under increased heat and hydrostatic pressures, to not only augment and enhance the gripping capacity of the mechanical connection but also to ensure an environment that is devoid of debris that could allow for pressure loss and affect the proper functioning of the pipe and clutch connector assembly 1. Each seal is placed such that the torus body of elastomeric seals 84, 99, 104, 106, and 108 reside in an accepting channel created in both the exterior, outer circumferences of female sub connector 10, the exterior, outer circumference of male sub connector 20 and the interior lower third of the locking collar sleeve for the securing, placement and immobility of the received seals. Adjacent wiper rings 85, 103, 105 and 107 are either integrated into the cylindrical outer body or installed atop and bottom of the elastomeric seals 84, 104, 106 and 108 to further bolster and maintain the contaminant thwarting and expandable securing function of each elastomeric seal. The internalized accepting channel for elastomeric seal 99 is flush within the annular radius of the locking collar sleeve, internally, thereby protecting the area of the locking dogs 18 from debris infiltration upon pressure induced expansion of the o-ring and the gripping of the external female sub connector's circumference. In all, the combination of the internally residing elastomeric seals 99, 104, 106 and 108, between the exterior of the male sub connector 20 and female sub connector interior surface, the externalized elastomeric seal, about the circumference of the female sub connector 10, just above the locking dogs 18, and elastomeric seal 99 within the locking collar sleeve 15 ensures a hermetically sealed atmospheric chamber created by the "energizing" and expanding the elastomeric seals, via increasing wellbore pressure (as well as hydrostatic or applied pressure) that prevents ingress of debris, internally between the sub connectors and externally between the locking collar sleeve and female sub connector 10, respectively, infiltration of which could result in the locking collar 15 becoming inefficient, inoperable, difficult to uncouple or all three. In essence, these "energized seals" provide a secondary "hydraulically" inducted locking mechanism that strengthens with increased pressure (e.g., hydrostatic, wellbore or applied pressure) and can only be relieved via decreased pressure (i.e., decreased depth or pressure application) thus assisting in preventing uncoupling, disallowing fluid and debris intrusion, internally, and protecting the locking dogs 18, internally and externally—both within the junction between male sub connector 20 and female sub connector 10 and external to the connector between female sub connector 10 and interior space 11 of locking collar sleeve 15. The elastomeric seals therefore serve an integral augmenting purpose of (1) sealing the locking dog functional area (by preventing fluid and debris contamination of the area), externally, about the female sub connectors outer surface and (2) providing internalized elastomeric seals on the male neck region 48 that serves to isolates all wellbore fluids from entering innermost point of sub connector contact (including male sub connector neck region 48 area) to ensure cleanliness of the operable mechanisms, internally, in a sealed atmospheric chamber.

Figure 12A:
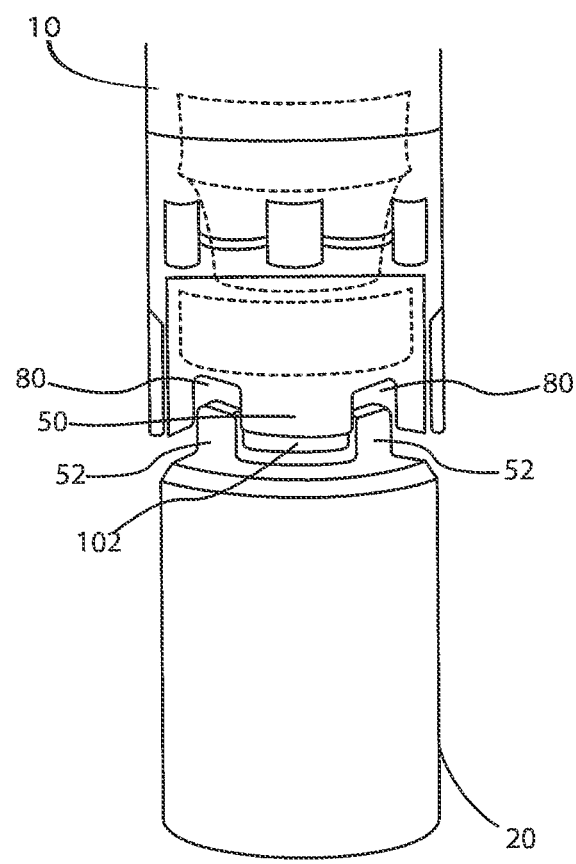
FIG. 12A displays both male and female sub connection that are made to receive the spring-loaded internal locking dog mechanism in a disconnected orientation.
Figure 12B:
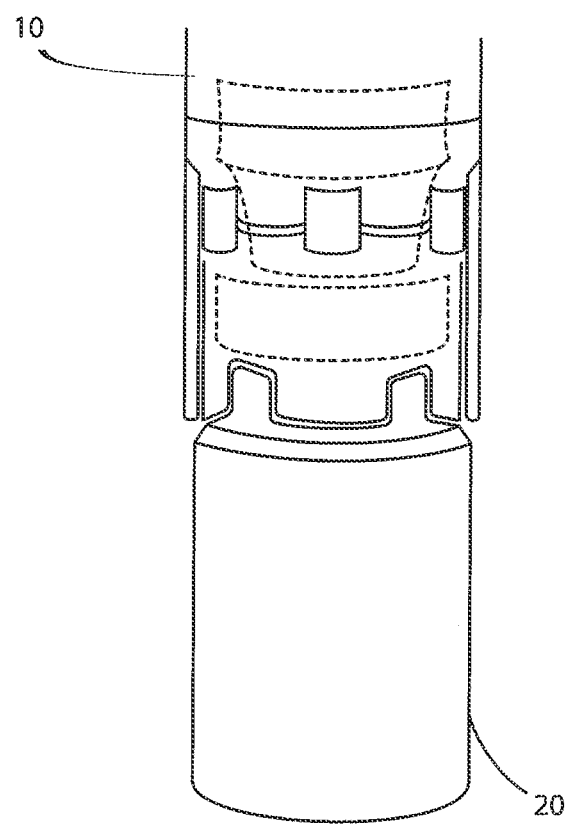
FIG. 12B displays both male and female sub connection that are made to receive the internal locking dog mechanism in a connected orientation with locking collar in a fully engaged orientation.

In operation as depicted in FIGS. 12A and 12B, the male sub connector 20 and female sub connector 10 are mated, where interdigitation of the castellation protrusion 50 on the female sub connector 10 is made to communicate with recess 102 on male sub connector 20 and castellation protrusion 52 on the male sub connector 20 is made to communicate with recess 80 on female sub connector 10, and their engagement is secured through the threaded tightening of the locking collar 15 resulting in locking dog 18 actuation and the locking dogs 18 lateral attachment to the recessed 42 area of the male sub connector neck region 48. The initial point of attachment is aided by four threaded starting points to facilitate ease of attachment and decreased difficulty in attaching the locking collar sleeve 15 to the exterior of the female sub connector 10. The external threaded advancement of the locking collar 15, ultimately results in a decreased diameter, internally, where the narrowing inner circumference of the locking collar 15 is designed to gradually exert force inwardly via the tapered face 33 of the locking dogs 18—in opposition to their naturally outward spring tensioned, compressive state—resulting in the securing of the internalized male connector sub 20 to female sub connector 10, via reversable clamping of the neck region 48 circumferential recess 42 of male sub connector 20. The locking collar 15, once in the advanced positioned, is then secured by a plurality of threaded connectors or set screws initiated through orifices 55, in the present case four set screws set each at 90 degrees that are made to communicate with the area just posterior to the exteriorly residing helical thread 35 of the female sub connector 10. Yet, while the male sub connectors 20 and female 10 are indeed internally connected at the true point of connection, between locking dogs 18 and male connector sub portion neck 48 circumferential recess 42, transference and distribution of weight on the clutch connector assembly 1 itself is actually relocated away from the locking dogs 18 to the externally sound, weight bearing exterior of the female sub connector 10 to the exteriorly sound, weight bearing portion of the load shoulder 12 of the male sub connector 20 when in use. This design feature prevents excessive force being applied to both the locking dogs 18 and their four accompanying windows 39 upon invention descent.

In opposition, only when load is applied to the sub connectors in the upward direction, via retrieval, do the locking dogs 18 and accompanying windows 39 experience any force or exhibit any load carrying capacity.

It should be further noted that the castellation, as depicted, is representational of a square-type castellation, but the castellation can be any variety of numbers (odd or even), shapes and sizes, so long as each provides torque loading and locking of the assembly in both a clock wise and counter clockwise rotation during operations (such as drilling) that ultimately results in the elimination of the possibility of the connection backing off (i.e., becoming unthreaded and detached).

Finally, the design and features that constitute the present invention are further distinguished, in coiled tubing and drilling operations, by any one of varied internalized valve assemblies 31 incorporated to prevent the return of hydrocarbons to the surface via the inside diameter of the connector assembly. Although the dual flapper check valve assembly 31 may be installed within either the male of female connector sub, the valve of the present assembly is installed within the female connector sub 10 where flappers are hinged and spring loaded to return to a closed position in the event that hydrocarbons seek to travel upwards within the centrally disposed annular channel 40 of the clutch connector assembly 1. Once the pressure of the hydrocarbons is applied upward and the flappers have closed, the internalized valve will seal and prevent fluid travel to the surface.

As evidenced in FIG. 4, of greatest advantage to the presented check valve assembly 31 itself is the dual flapper arrangement that it is housed in a carrier body 38 wherein the carrier body 38 is an easily retrievable and replaceable service item that can be removed readily by disconnecting the clutch female sub connector 10 and male sub connector 20. By unscrewing the locking collar sleeve 15 from the helical ridge about the exterior "male" thread 35 of the female sub connector 10, loosening the locking collar sleeve 15, releasing the locking dogs 18 and pulling the sub connectors apart, the carrier body 38 may be easily repaired or replaced. If the two sub connectors cannot be uncoupled through manually applied pressure in opposite directions, prying the two sub connectors apart via the separation force created between the locking collar sleeve base 16 and the load shoulder 12 may be accomplished through the downward force created through locking collar disengagement via the final decoupling rotation. As shown in FIG. 2, where locking collar sleeve base 16 is in immediate contact with loading collar 12 and the internalized helical ridge 30 of locking collar sleeve 15 and helical ridge about the exterior "male" thread 35 of the female sub connector 10 remain in immediate connection, the continued counterclockwise rotation, removing the locking collar 15 from the female sub connector 10, itself, causes the movement of male sub connector downward—through the downward pressure created by locking collar 15 and its disengagement and the pressure realized from the locking collar sleeve base 16 being transferred to loading shoulder 12—thereby forcing separation of the two sub connectors.

Clearly the current application has many advantages over the prior art, including at least the following: (1) replacement of the traditional threaded pipe configuration, (2) mechanical connection via a spring-loaded, locking dog mechanism, (3) a pressurized, elastomeric seal system for assisting and maintaining of connection, preserving connection integrity and maintaining a clean working internalized mechanism, (4) replacement of the need for attachment or torquing equipment, (5) a locking collar "sleeve" for securing, attachment and assisted detachment of male and female sub connectors, (6) bi-directional, clockwise and counterclockwise, rotation, (7) sustainable torque transfer away from the operational components of the connection and (8) a repairable and replaceable internalized valve to prevent hydrocarbon fluid return through the central cavity of drilling pipe.

It is important to note that the particular embodiments disclosed above are for illustrative purposes only, as the presented invention may be modified and practiced in different, but equivalent manners (i.e., where male "pin" and female "box" attachments are reversed or the sleeve is advances with a counterclockwise rotation and removed via a clockwise rotation) which would be apparent to those having skill in the art as instructed by the teaching herein. It is therefore evident and possible that the particular embodiments disclosed above are alterable and modifiable, but that all such iterations are encompassed by the above disclosure and the protections sought are covered herewith. Although the present application discloses a finite number of forms and examples, the present invention is not limited to just these forms and examples but is amendable to various changes and modifications without departing from the spirit thereof

I claim:

1. A locking assembly system for combining threaded or non-threaded pipe sections, tubing and bottom hole assemblies, comprising:
    a tubular male sub connector;
        said tubular male sub connector exhibiting hollow neck for insertion into a hollow cylindrical center of a female sub connector;
        said tubular male sub connector exhibiting a recessed circumferential region exhibited about said neck for acceptance of a spring-loaded locking dog mechanism from said female sub connector;
        said tubular male sub connector exhibiting external, terminal castellations made to receive corresponding external castellations on said tubular female sub connector for interdigitated coupling, therein;
    a tubular female sub connector;
        said tubular female sub connector exhibiting a hollow cylindrical center for accepting the hollow neck of a male sub connector;
        said tubular female sub connector exhibiting a set of windows harboring spring-loaded locking dogs for connection to the inserted hollow neck of said tubular male sub connector;
        said tubular female sub connector exhibiting external, terminal castellation projections created to receive corresponding external, terminal constellations of said male tubular sub connector capable of interdigitation;
        said tubular female sub connector exhibiting externally displayed, helical threads;
    a set of spring-loaded locking dogs;
        said set of spring-loaded locking dogs within said female sub connector windows and actuated by compression springs made to connect to said internalized male sub connector recessed neck;
    a locking collar sleeve;
        said locking collar sleeve securing said tubular male sub connector neck within said tubular female sub connector's hollow cylindrical center;
        said locking collar sleeve, utilizing an internalized, helical thread made to communicate with said externally displayed, helical thread of the female sub connector, and a narrowing internal circumference for said locking dog actuation for securing of said sub connectors;
        said locking collar sleeve thereby joining said male sub connector and said female sub connector as said locking collar sleeve is advanced and locking dogs are engaged;
    securing screws; and
        said securing screws set through said locking collars thickness for securing said locking collar about a recessed groove in said female sub portion;
    an internal annulus;
        said internal annulus, exhibited by both male and female sub connectors, which displays a uniform diameter between each communicating sub connector.

2. The locking assembly system of claim 1, wherein the interdigitation achieved through the male and female sub connector castellated interdigitation, secured through locking collar advancement and spring-loaded locking dog depression, allows for bi-directional movement in both clockwise and counterclockwise rotation about the central axis.

3. The locking assembly system of claim 1, wherein said male and female sub connectors may exhibit a threaded male connectors, female connectors or a combination thereof at either end away from the locking assembly.

4. The locking assembly system of claim 1, wherein either the male or female sub connector harbors a valve, in the form of a manually accessible check valve to prevent the return of hydrocarbon fluids and gasses to the surface.

5. The locking assembly system of claim 1, wherein the male sub connector's neck expresses two external diameters consisting of:
    a larger external diameters made to communicate with a larger inner diameter of said female sub connector; and
    a smaller external diameters made to communicate with a smaller centrally disposed inner diameter of the female sub connector.

6. The locking assembly system of claim 5, wherein the male sub connector is further comprised of:
    said neck exhibiting indentions accepting of elastomeric rings between the internal diameter of said female sub connector and the external diameter of said male sub connector;
    said neck is made to accept depressed locking dogs; and
    said neck made to exhibit a terminally tapered edge for ease of insertion into the accepting narrower internal diameter of the female sub connector and for the creation of seal between the connection of male and female sub connectors.

7. The locking assembly system of claim 1, wherein the female sub connector consists of internalized diameters consisting of:
    a larger internal diameter that is made to accept the larger diameter of the male sub connector;
    said larger internal diameter harboring windows for the acceptance of spring-loaded locking dogs;
    an internal, smaller diameter made to communicate with the smaller diameter of the male sub connector; and
    an internalized annular indention accepting an elastomeric seal at the intersection of said smaller and larger diameters.

8. The locking assembly system of claim 7, wherein the female sub connector is made to exhibit a recess about its circumference for accepting locking screws, through the thickness of the locking collar, for securing of the locking collar onto the female sub connector.

9. The locking assembly system of claim 1, wherein inward facing upper and lower edges of said locking dogs are tapered to accept the narrowing internal circumference of the locking sleeve collar.

10. The locking assembly system of claim 1, wherein said spring-loaded locking dogs may exhibit "C"-shaped, semi-circular compression springs for securing male sub connector neck.

11. The locking assembly system of claim 1, wherein said male sub connector exhibits an external load bearing shoulder between said male sub connector and female sub connector castellation projections made to insure the distribution of the load through the female sub connector and onto the male sub connector load shoulder, away from the locking dogs and windows upon descent.

12. The locking assembly system of claim 11, wherein said load bearing shoulder is also a detachment shoulder where the advancement of said locking collar forces disengagement said male sub connector from said female sub connector and separation.

13. The locking assembly system of claim 12, wherein ascent removes load pressure from the load bearing shoulder and onto said locking dogs and said locking dog windows upon assembly retrieval.

14. The locking assembly system of claim 1, wherein the male and female sub connectors are made to exhibit flat areas, indented into their cylindrical outer circumference, either 90 or 180 degrees form one another, capable of accepting a wrench or similar implement for securing said locking system into existing pipe or bottom hole assembly.

15. The locking assembly system of claim 1, wherein elastomeric seals are placed about the outer diameter of neck of said male sub connector, between the outer diameter of the neck and the female sub connector, and place about the exterior circumference of the female portion, between the outer diameter of the female sub portion and the locking collar sleeve interior.

16. A method for securing a system for locking together threaded or non-threaded pipe sections, tubing and bottom hole assemblies, comprising the steps of:
   manually attaching threaded pipe or similar downhole equipment to both male and female sub connectors;
   manually inserting a male sub connector neck through a cylindrical locking collar sleeve and into the open receiving diameter of a female sub connector;
   guiding the male sub connector neck of the male sub connector into the centrally-located, diameter of the female sub connector creating a uniform internal annular diameter;
   guiding the raised castellations of the male sub connector into the corresponding recesses of the female sub connector and raised castellations of the female sub connector into the recesses of the male sub connector to create a flush connection;
   interdigitating the corresponding castellations to a terminus where further advancement is halted by complete communication;
   manually tightening the cylindrical locking collar sleeve, via advancement along a helical, externally exhibited thread on the female sub connector that is made to communicate with an internalized helical thread inside of the locking collar;
   manually advancing said cylindrical locking collar upward by clockwise turning of the locking collar and causing externally-residing, spring-loaded locking mechanisms within the female sub connector to become actuated via a narrowing internal diameter that transitions from wide to narrow as the locking collar sleeve is tightened about the female sub connector;
   causing the spring-loaded locking mechanisms to engage an annular recess evidenced about the circumference of the inserted neck of the male sub connector;
   manually tightening said locking collar sleeve, thereby fully engaging each locking dog about the recessed neck of the male sub connector to a point where further tightening is halted resulting in communication of locking collar and halting shoulder; and
   securing said locking collar via a set of securing screws to the exterior of the female sub connector.

17. The method of claim 16 wherein an internal valve is retrieved from between the male or female sub connector and is either serviced, repaired or replaced.

18. A method for uncoupling a locking system of threaded or non-threaded pipe sections, tubing and bottom hole assemblies, comprising the steps of:
   manually loosening a locking collar by unfastening securing screws;
   manually advancing said collar downward, along an exteriorly residing, female sub connector thread, away from a halting shoulder exhibited about the circumference of the female sub connector, by counterclockwise turning the locking collar and causing externally-residing, spring-loaded locking mechanisms within the female sub connector to become de-actuated via an expanding internal collar diameter which transitions from narrow to wide as the locking collar is loosened about the female sub connector;
   halting disengagement of the collar to a point of just before the terminal area of thread about the exterior of the female sub connector;
   manually loosening the locking collar to a point where, while the internal collar threads and external female sub connector threads remain in contact, where further loosening is halted by the opposite end of the cylindrical locking collar via a corresponding halting shoulder, and
   either manually pulling the two sub connectors apart or continuing the counterclockwise turning until the locking collar creates enough force to "ply" both sub connectors apart for complete uncoupling;
   removing the male sub connector neck; and
   removing the locking collar sleeve by removing the attachment screws.

* * * * *